United States Patent
Patel et al.

(10) Patent No.: US 10,212,042 B2
(45) Date of Patent: *Feb. 19, 2019

(54) AUTOMATIC GENERATION OF LOGICAL MAPS FOR ACCESS POINT LAYOUTS

(71) Applicant: Fortinet, Inc., Sunnyvale, CA (US)

(72) Inventors: Hardik Arvindbhai Patel, Bangalore (IN); Yi-Yu Lin, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,586

(22) Filed: Jan. 4, 2018

(65) Prior Publication Data

US 2018/0176733 A1   Jun. 21, 2018

Related U.S. Application Data

(63) Continuation of application No. 14/998,407, filed on Dec. 30, 2015, now Pat. No. 9,967,709.

(60) Provisional application No. 62/098,329, filed on Dec. 30, 2014.

(51) Int. Cl.

| | |
|---|---|
| *H04L 12/24* | (2006.01) |
| *H04W 4/02* | (2018.01) |
| *H04W 16/20* | (2009.01) |
| *H04W 64/00* | (2009.01) |
| *H04W 4/04* | (2009.01) |
| *G01S 11/06* | (2006.01) |
| *H04W 4/40* | (2018.01) |
| *H04W 4/33* | (2018.01) |

(52) U.S. Cl.
CPC .............. *H04L 41/12* (2013.01); *G01S 11/06* (2013.01); *H04L 41/145* (2013.01); *H04W 4/023* (2013.01); *H04W 4/026* (2013.01); *H04W 4/043* (2013.01); *H04W 4/33* (2018.02); *H04W 4/40* (2018.02); *H04W 16/20* (2013.01); *H04W 64/003* (2013.01); *H04W 64/006* (2013.01)

(58) Field of Classification Search
CPC ....... H04W 4/02; H04W 4/023; H04W 64/00; H04W 64/003; H04W 4/026; H04W 4/04; H04W 84/18; H04W 8/005; H04W 24/08; H04W 4/025; H04W 4/028; H04W 64/006; H04L 41/12; H04L 41/145; H04L 41/0893; H04L 41/22; G01S 11/06; G02S 5/00

See application file for complete search history.

(56) References Cited

U.S. PATENT DOCUMENTS

| | | | |
|---|---|---|---|
| 9,967,709 B2* | 5/2018 | Patel ................ | H04W 4/023 |
| 2011/0170524 A1* | 7/2011 | Arslan .............. | G01S 5/0252 370/338 |
| 2012/0307792 A1 | 12/2012 | Ram et al. | |

(Continued)

*Primary Examiner* — Magdi Elhag
(74) *Attorney, Agent, or Firm* — Law Office of Dorian Cartwright; Dorian Cartwright

(57) ABSTRACT

A logical mapping of a plurality of access points is automatically generated. Each of the plurality of access points is plotted on a logical map. Lengths of connection lines between access points pairs are determined for each of the plurality of access points on the logical map. Connection lines are oriented in combination with adjustments to the plotted access points on the logical map to run connection lines between each of the access point pairs. Some of the access points are part of more than one access point pair as represented by more than one connection line connected to the at least one access point.

12 Claims, 6 Drawing Sheets

(56) References Cited

U.S. PATENT DOCUMENTS

2013/0324147 A1  12/2013  Ong
2015/0126215 A1   5/2015  Pandey
2016/0135007 A1   5/2016  Persson
2016/0345286 A1*  11/2016 Jamieson ............... H04B 17/12

* cited by examiner

AUTOMATIC GENERATION OF LOGICAL MAPS FOR ACCESS POINT LAYOUTS

CROSS-REFERENCE TO RELATED APPLICATIONS

This application claims priority as a continuation of U.S. patent application Ser. No. 14/998,407, filed Dec. 30, 2015, entitled AUTOMATIC GENERATION OF LOGICAL MAPS FOR ACCESS POINT LAYOUTS, by Hardik PATEL, et al., which claims the benefit of priority under 35 U.S.C. 119(e) to U.S. Application No. 62/098,329, filed Dec. 30, 2014, entitled AUTOMATIC GENERATION OF LOGICAL MAPS FOR ACCESS POINT LAYOUTS, by Hardik PATEL, et al., the contents of each being hereby incorporated by reference in their entireties.

FIELD OF THE INVENTION

The invention relates generally to computer networking, and more specifically, to automatically generating logical maps for access point layouts.

BACKGROUND

Access points allow wireless stations to reach a network backbone. In more detail, a lap top computer or a smart telephone establishes a connection with an access point within RF (radio frequency) range in order to exchange packets with the access point as a proxy to the backbone network. Each access point has a limited RF range, so multiple access points are deployed amongst a physical location such as a company building for adequate coverage. Some areas of the building may have heavy usage by lots of wireless stations and require additional access points within the same RF range to handle the load. An access point layout plots each of the access points within the physical location, which can be useful for many purposes such as identifying coverage area dead spots.

Problematically, a network administrator visits each access point and manually logs a location in order to create the layout. When stations are moved from one location to another to adjust coverages or handle varying loads, the network administrator typically makes another manual visit to the new location in order to revise the layout.

What is needed is a robust technique to automatically generate logical maps for access point layouts.

SUMMARY

The shortcomings of the prior art are addressed by methods, (non-transitory) computer program products, and systems for automatically generating a logical mapping of the plurality of access points, as described herein.

In one embodiment, each of the plurality of access points is plotted on a logical map. Lengths of connection lines between access points pairs are determined for each of the plurality of access points on the logical map. Connection lines are oriented in combination with adjustments to the plotted access points on the logical map to run connection lines between each of the access point pairs. In one embodiment, at least one of the access points is part of more than one access point pair as represented by more than one connection line connected to the at least one access point.

In another embodiment, connection line lengths are determined by identifying the access point pairs based on a first access point and a second access point being within radio range of each other. A data packet is caused to be sent from the first access point to the second access point, for each of the access points within range of each other. A first RSSI (radio signal strength indicator) value of the data packet sent from the first access point is received. A second RSSI value of the data packet received at the second access point is received. A distance between the access point pairs is estimated by comparing the first RSSI value to the second RSSI value. A connection line is generated for each of the access points pairs, wherein a length of the connection line is scaled according to the estimated distance between corresponding first and second access points.

In still another embodiment, a virtual access point can be plotted in order to determine the effect upon the logical mapping.

Advantageously, a relative mapping between access points is quickly generated without manual effort. Furthermore, dead spots can be quickly identified and potential placements of access points can be assessed without actually placing an access oint.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The shortcomings of the prior art are addressed by methods, (non-transitory) computer program products, and systems for automatically generating a logical mapping of the plurality of access points. Generally, one of ordinary skill in the art will recognize that the examples set forth herein are non-limiting and only illustrative of widely-applicable principles.

I. Logical Layout Maps (FIGS. 1-2)

Figure 1:
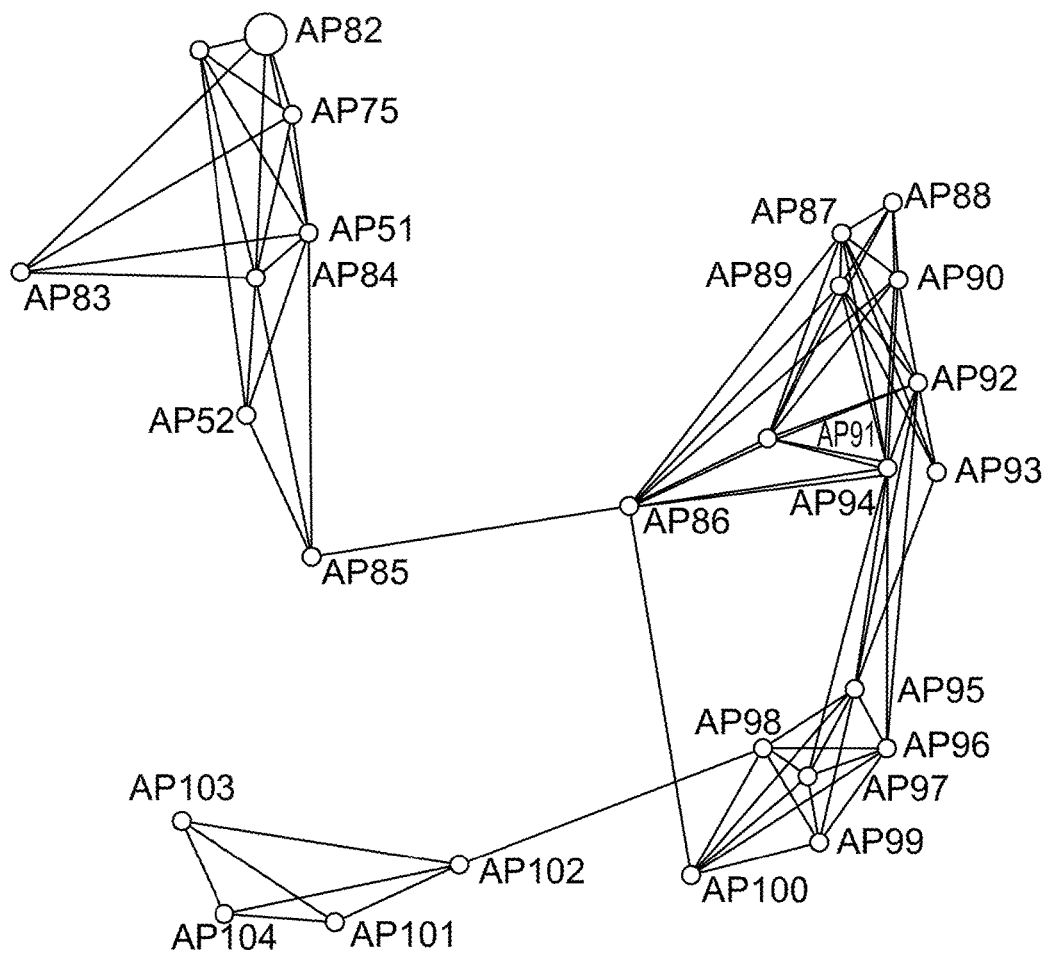
FIG. 1 is a schematic diagram illustrating automatically generated logical maps for access point layouts, according to one embodiment.

FIG. 1 is a schematic diagram illustrating an automatically generated logical map for an access point layout, according to one embodiment. Each node shows an access point (e.g., AP83, AP100, AP103, etc.). Connectors between access points identify where RF ranges of radios on access points overlap (e.g., line between AP85 and AP86), thereby forming a connection between the access points. Some access points have numerous connections (e.g., AP95 having 8 connections), while some access points can have no connections.

In more detail, connector lengths represent distances between nodes. Edge nodes can be identified by a common direction of connectors (e.g., AP83, AP81, AP82 on the left edge and AP101, AP102, AP103 and AP104 on the right edge). Nodes between different buildings may be identified by, for example, a single connector having a long length (e.g., AP85 and AP86 are in different buildings). In some embodiments, nodes are sized in accordance with visibility or number of connected stations. As a result, deployment of access point density can be visualized, and adjusted.

Figure 2:
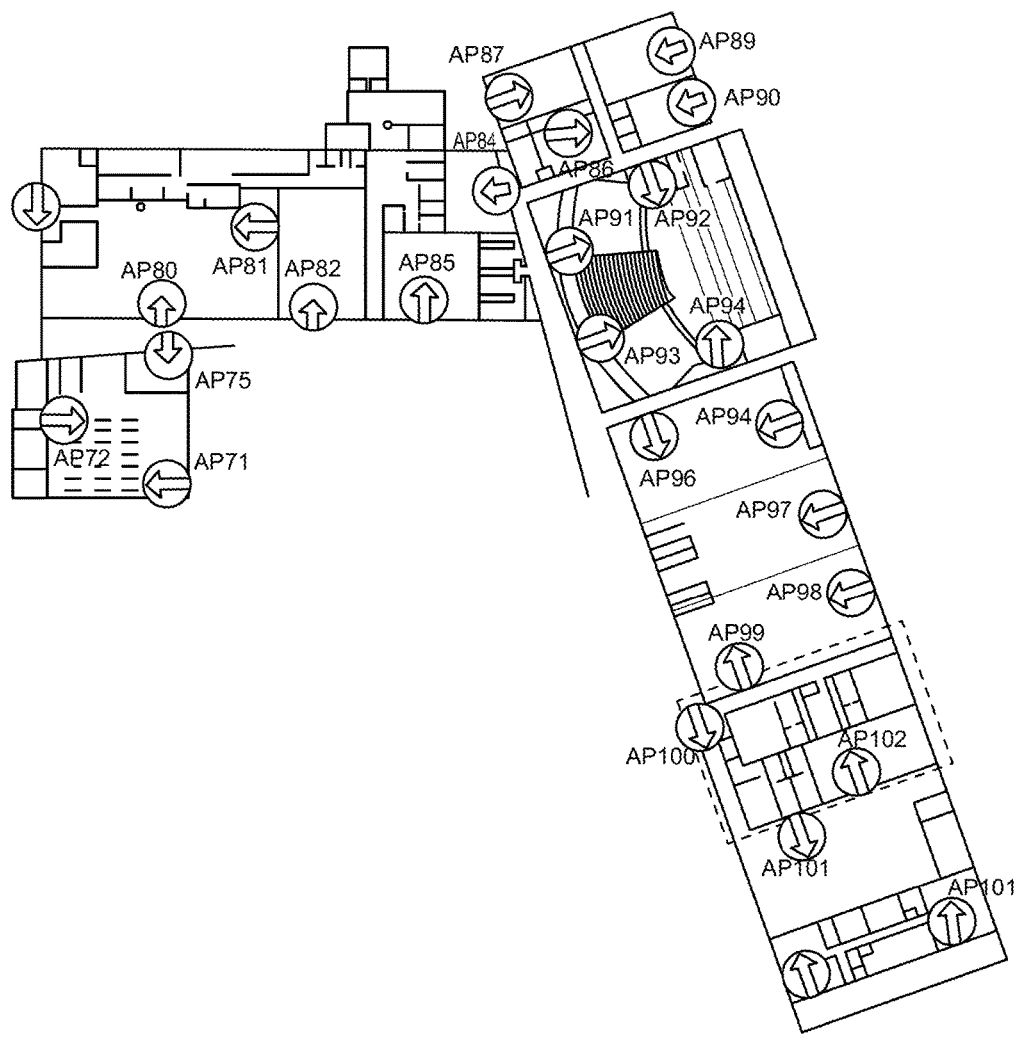
FIG. 2 is a schematic diagram illustrating an actual floor layout corresponding to the automatically generated access point mental map of FIG. 1, according to one embodiment.

By comparison, FIG. 2 is a schematic diagram illustrating an actual floor layout 200 corresponding to the automatically generated logical map 100 of FIG. 1. Actual locations of the same access points are shown and although geographical locations may not be precise, a relative density of access points can be ascertained from logical maps.

II. Systems to Automatically Generate Logical Maps for Access Point Layouts (FIG. 3)

Figure 3:
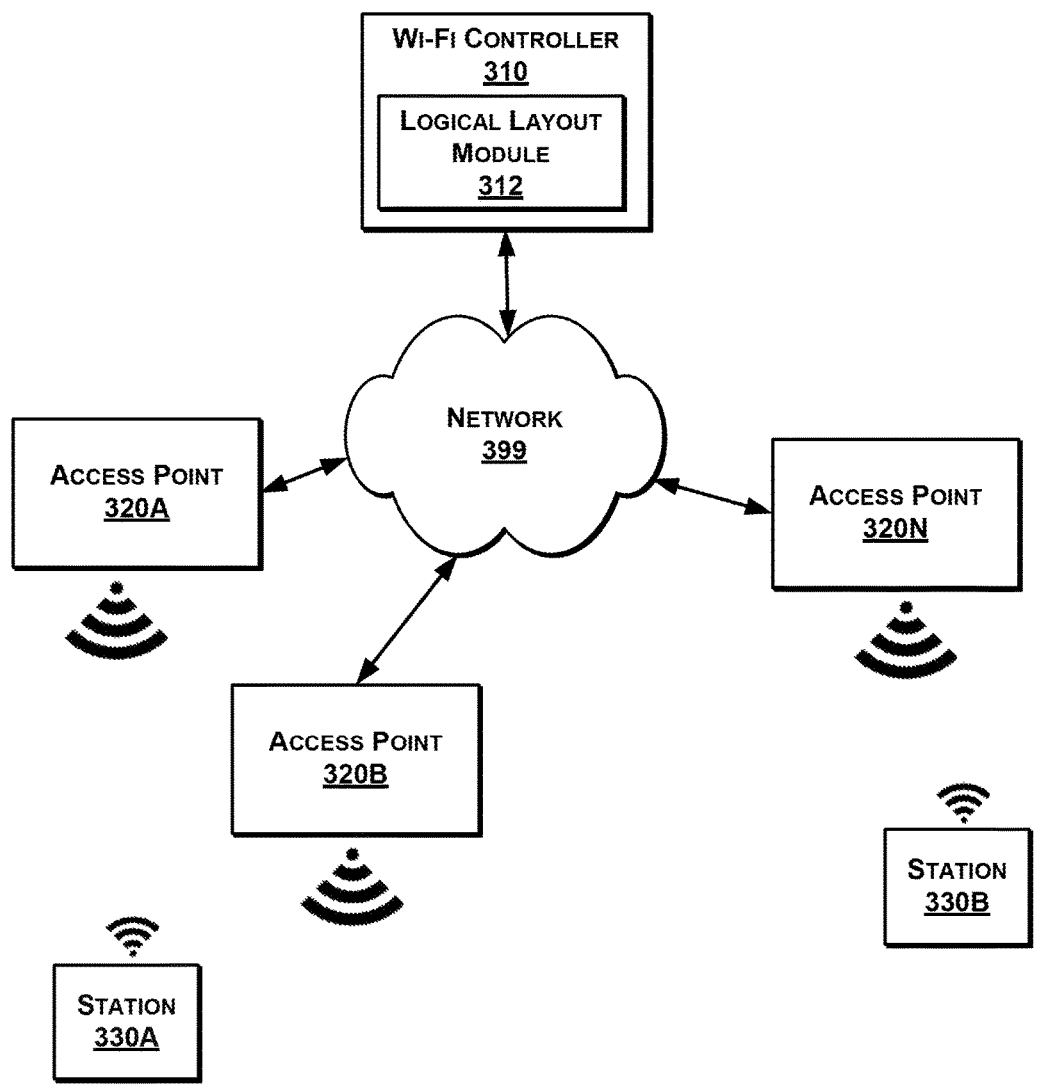
FIG. 3 is a high-level block diagram illustrating a system to automatically generate logical maps for access point layouts, according to one embodiment.

FIG. 3 is a high-level block diagram illustrating a system 300 to automatically generate logical maps for access point layouts, according to one embodiment. The system 300 includes, a Wi-Fi controller 310, access points 320A-N, and stations 330A-B coupled to a network 399. The network 399 can be a LAN, WAN, the Internet, a cloud-based network, a data network, a cellular network, a hybrid network, or the like. Access points 320A-N are wireless coupled to the stations 330A-B. The system 300 is merely an example of many possible configurations which could include more or less access points, controllers, stations, and can also include well known components such as routers, switches, and firewalls. The components can be implemented in hardware, software, or a combination.

The Wi-Fi controller 310 further comprises a logical layout module 312 to coordinate RSSI interrogations from the access points 320A-N. When it is determined that two access points are within range of each other, an RSSI strength can be measured for packets received by one access point transmitted by another access point. The logical layout module 312 having an RSSI measurement as received for comparison to an RSSI transmission strength, can estimate a distance traveled by the packet. When three access points are in range of each other, the triangulation effect reveals not only distances between each other, but also relative positioning from the connector length data. Using the visibility, distance and relative positing information, logical layout maps can be generated, such as the example logical layout map 100 of FIG. 1.

Additional features can be gleaned from the logical layout map. For example, filtering can show access points by floor or by building. A physical boundary map can be added for more accuracy in inferring which access points are located on different floors or in different buildings. Additionally, a number of connections can be determined and a corresponding node sized based on the number of connections, so that coverage density and connection density can be visualized. In one embodiment, a virtual access point can be plotted in order to determine the effect upon the logical mapping. In other embodiments, other Wi-Fi devices such as stations, mesh networks, and radio tags (e.g., location tags broadcasting iBeacons) are also mapped.

The logical layout module 312 can be integrated with the Wi-Fi controller 310 at an operating system level or installed as an application. Alternatively, the logical layout module 312 can be partially or fully integrated with the access points 320A-N, the stations 330A-B, or an SDN (software-defined network) controller (not shown). In still other embodiments, the logical layout module 130 can be implemented in a dedicated device, or be a cloud-based service provided by a third party. Combinations of implementations are also possible.

More generally, the Wi-Fi controller 310 (e.g., an MC1500 or MC6000 device by Meru Networks/Fortinet Inc. of Sunnyvale, Calif. as described in U.S. application Ser. No. 13/426,703 filed Mar. 22, 2012 and commonly-assigned) provides centralized management for the access points 320A-N. The Wi-Fi controller 310 can provide many other services to the network 399 such as virtual cell and virtual port functionalities (see further description in U.S. application Ser. No. 13/426,703, which is hereby incorporated by reference).

In general, the access points 320A-N can individually represent one or more computing devices. For example, the access points 320A-N can be an AP110 or AP433 (modified as discussed herein) by Meru Networks/Fortinet, Inc. of Sunnyvale, Calif. Each access point 140A-B is preferably connected to the network 399 (e.g., gateway, switch, router, hub, or another access point that is connected to the network 399) via a wired connection, but in some embodiments, such as a mesh network, the uplink connection is wireless. The access points 320A-N can be set-up in various configurations to provide wireless coverage areas. In another embodiment, the functionality is incorporated into a switch or router.

The stations 330A-B can be, for example, a personal computer, a laptop computer, a tablet computer, a smart phone, a mobile computing device, an Internet appliance, a non-wireless device modified to have wireless capabilities, or any other appropriate processor-driven computing device. A station is wirelessly coupled to an access point. No pre-configuration or client is needed, in an embodiment.

III. Methods for Automatically Generating Logical Maps for Access Point Layouts (FIGS. 4-5)

Figure 4:
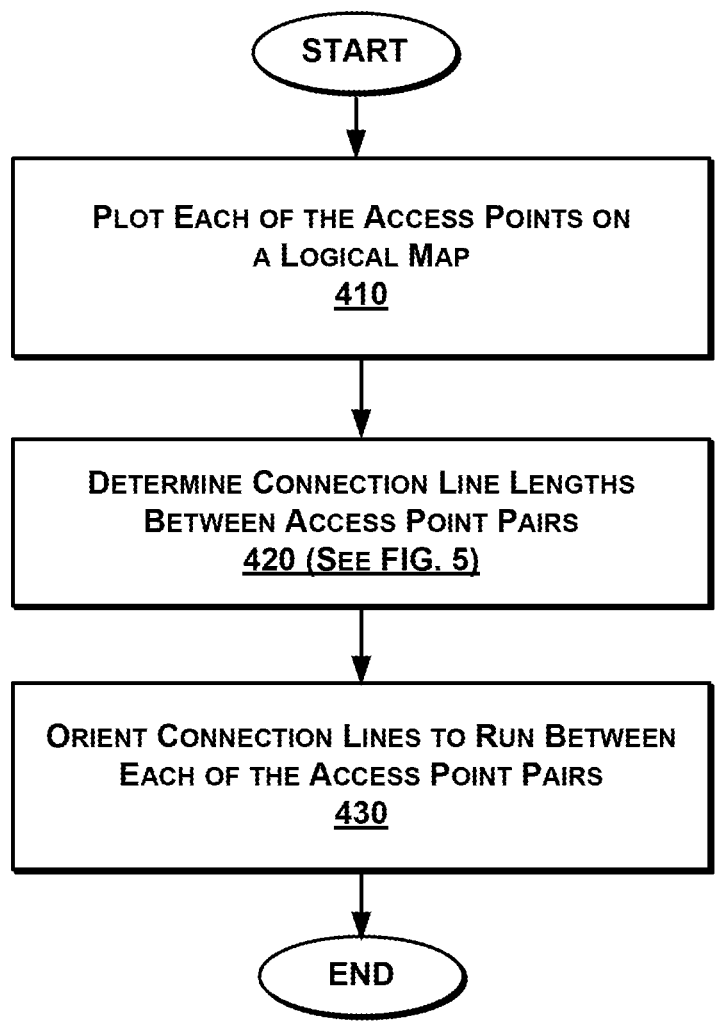
FIG. 4 is a block diagram illustrating a method for automatically generating logical maps for access point layouts, according to one embodiment.

FIG. 4 is a block diagram illustrating a method 400 for automatically generating logical maps for access point layouts, according to one embodiment.

Each of the access points is plotted on a logical map (step 410). Lengths of lines between access point pairs is determined (step 420), as is further described in association with FIG. 5. Connection lines are oriented to turn between each of the access point pairs (step 430).

Figure 5:
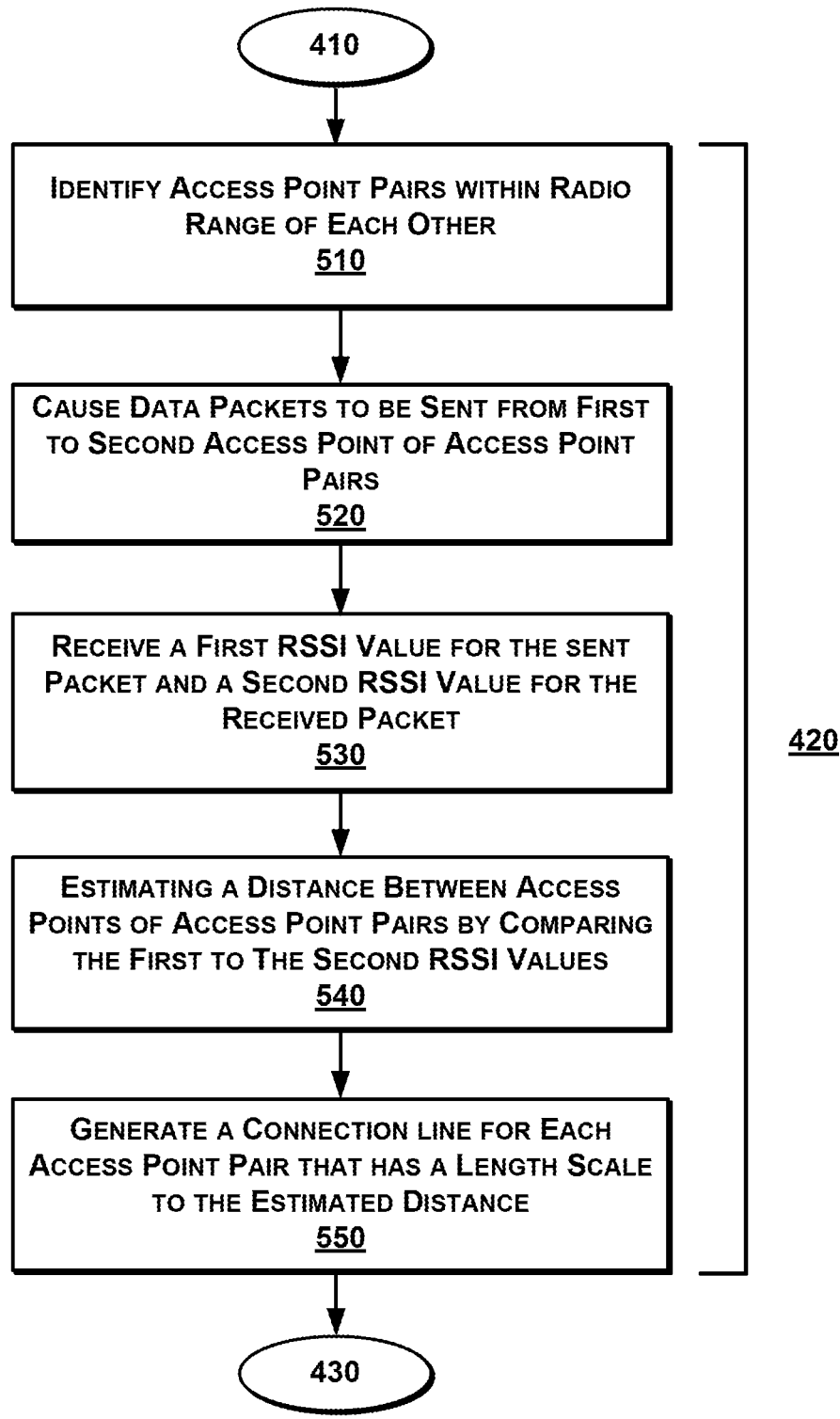
FIG. 5 is a block diagram illustrating a method for determining lengths of connection lines between access point pairs, according to one embodiment.

FIG. 5 is a block diagram illustrating the step 220 for determining lengths of connection lines between access point pairs, according to one embodiment. Access point pairs within radio range of each other are identified (step 510). Data packets are caused to be sent from first to second access points of access point pairs (step 520). A first RSSI value for the sent data packet and a second RSSI value for the received data packet is received (step 530). A distance between access points of the access point pairs is estimated by comparing the first and second RSSI values (step 540). A connection line is generated for each access point pair, the connection line having a length scaled to the estimated distance (step 550).

IV. Generic Computing Device (FIG. 6)

Figure 6:
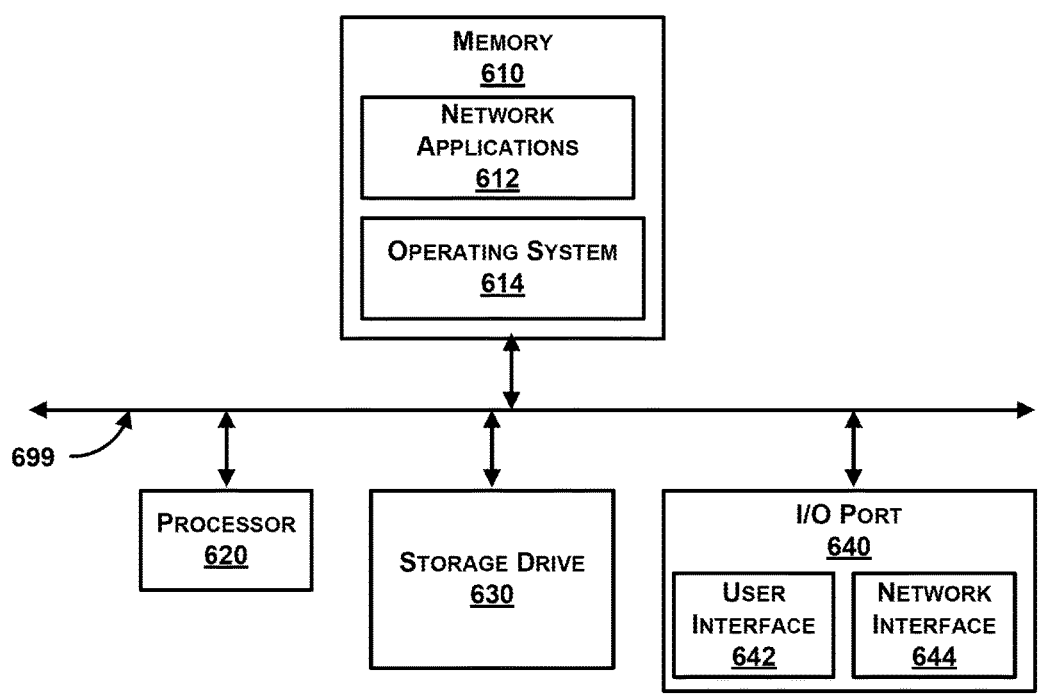
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including cloud-based Wi-Fi controller 110, the local Wi-Fi controller 310, the access points 320A-N, and the stations 330A-B. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIG. 3. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 65, 68, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a controller device that manages a plurality of access points for automatically generating a logical mapping of the plurality of access points, the method comprising the steps of:

plotting each of the plurality of access points on the logical map, at least one of the plurality of access points comprising a virtual access point;

determining connection line lengths between access points pairs for each of the plurality of access points on the logical map, comprising:

identifying the access point pairs based on a first access point and a second access point being within radio range of each other;

causing a data packet to be sent from the first access point to the second access point, for each of the access points within range of each other;

receiving a first RSSI (radio signal strength indicator) value of the data packet sent from the first access point;

receiving a second RSSI value of the data packet received at the second access point estimating a distance between the access point pairs by comparing the first RSSI value to the second RSSI value;

generating a connection line for each of the access points pairs, wherein a length of the connection line is scaled according to the estimated distance between corresponding first and second access points;

orienting connection lines in combination with adjustments to the plotted access points on the logical map to run connection lines between each of the access point pairs, wherein at least one of the access points is part of more than one access point pair as represented by more than one connection line connected to the at least one access point; and determining an effect of the virtual access point on the logical map relative to not having the virtual access point on the logical map.

2. The method of claim 1, wherein the plotted access points are graphically distinguished to represent at least one of a number of connections, or a volume of activity.

3. The method of claim 1, wherein the connection lines are represented by a straight line.

4. The method of claim 1, further comprising:
overlaying the logical mapping onto a floorplan.

5. The method of claim 1, further comprising:
causing a second data packet to be sent from the second access point to the first access point to verify estimate distance.

6. The method of claim 1, wherein the access point pairs are identified by causing the data packet to be sent by broadcast from the first access point, and detecting the broadcast data packet at the second access point.

7. The method of claim 1, further comprising:
detecting a new access point by a neighboring access point;

responsive to the detection, plotting the new access point on the logical map;

determining new connection lines lengths from the new access point and at least one access point from the plurality of access points that is within range; and orienting the new connection lines in combination with adjustments to the plotted new access point.

8. The method of claim 7, wherein there is at least one adjustment to one of the plotted access points other than the new access point.

9. The method of claim 1, further comprising:
analyzing the logical mapping to identify dead spots for access point radio coverage.

10. The method of claim 1, wherein the Wi-Fi device operates according to an IEEE 802.11 protocol.

11. A non-transitory computer-readable medium storing source code that, when executed by a processor, performs a method in a controller device that manages a plurality of access points for automatically generating a logical mapping of the plurality of access points, the method comprising the steps of:

plotting each of the plurality of access points on the logical map, at least one of the plurality of access points comprising a virtual access point;

determining connection line lengths between access points pairs for each of the plurality of access points on the logical map, comprising:

identifying the access point pairs based on a first access point and a second access point being within radio range of each other;

causing a data packet to be sent from the first access point to the second access point, for each of the access points within range of each other;

receiving a first RSSI (radio signal strength indicator) value of the data packet sent from the first access point;

receiving a second RSSI value of the data packet received at the second access point estimating a distance between the access point pairs by comparing the first RSSI value to the second RSSI value; and generating a connection line for each of the access points pairs, wherein a length of the connection line is scaled according to the estimated distance between corresponding first and second access points; and orienting connection lines in combination with adjustments to the plotted access points on the logical map to run connection lines between each of the access point pairs, wherein at least one of the access points is part of more than one access point pair as represented by more than one connection line connected to the at least one access point; and determining an effect of the virtual access point on the logical map relative to not having the virtual access point on the logical map.

12. A controller device that manages a plurality of access points for automatically generating a logical mapping of the plurality of access points, controller device comprising:

a processor; and a memory, storing:

a first module to plot each of the plurality of access points on the logical map, at least one of the plurality of access points comprising a virtual access point;

a second module to determine connection line lengths between access points pairs for each of the plurality of access points on the logical map by:

identifying the access point pairs based on a first access point and a second access point being within radio range of each other;

causing a data packet to be sent from the first access point to the second access point, for each of the access points within range of each other;

receiving a first RSSI (radio signal strength indicator) value of the data packet sent from the first access point;

receiving a second RSSI value of the data packet received at the second access point estimating a distance between the access point pairs by comparing the first RSSI value to the second RSSI value;

generating a connection line for each of the access points pairs, wherein a length of the connection line is scaled according to the estimated distance between corresponding first and second access points;

a third module to orient the connection lines in combination with adjustments to the plotted access points on the logical map to run connection lines between each of the access point pairs, wherein at least one of the access points is part of more than one access point pair as represented by more than one connection line connected to the at least one access point; and a fourth module to determine an effect of the virtual access point on the logical map relative to not having the virtual access point on the logical map.

* * * * *